United States Patent [19]

Mele

[11] Patent Number: 5,325,567
[45] Date of Patent: Jul. 5, 1994

[54] BRAIDED LINE APPARATUS

[76] Inventor: Peter C. Mele, P.O. Box 533, Crown Point, N.Y. 12928

[21] Appl. No.: 113,343

[22] Filed: Aug. 30, 1993

Related U.S. Application Data

[63] Continuation-in-part of Ser. No. 844,446, Mar. 2, 1992, abandoned.

[51] Int. Cl.$^5$ ............................................. D07B 1/12
[52] U.S. Cl. ................................. 24/122.6; 24/265 H
[58] Field of Search .............. 29/447, 461, 432, 432.2; 57/202, 23; 87/8, 62; 16/206; 24/115 A, 122.6, 265 H, 265 A, 703.1; 403/265

[56] References Cited

U.S. PATENT DOCUMENTS

| | | | |
|---|---|---|---|
| 165,010 | 6/1875 | Manning | 16/206 |
| 236,557 | 1/1881 | Covert | 24/122.6 |
| 2,032,567 | 3/1936 | Fiege | 24/122.6 |
| 2,322,378 | 6/1943 | Merrick | 24/122.6 |
| 3,522,961 | 8/1970 | Cave, Sr. et al. | 24/122.6 |
| 3,570,074 | 3/1971 | Schimmeyer et al. | 24/122.6 |
| 3,909,886 | 10/1975 | Hocke | 24/122.6 |
| 4,055,365 | 10/1977 | Kucherry | 24/122.6 |

*Primary Examiner*—Timothy V. Eley
*Assistant Examiner*—David P. Bryant
*Attorney, Agent, or Firm*—Thomas N. Neiman

[57] ABSTRACT

The braided line apparatus comprises a flexible, braided line into which a portion of a solid shaft is inserted which expands the braided line relative to the dimensions under tension and creates initial friction between the shaft and the flexible braided line. The shaft has a constant diameter and has a curved neck portion to create a hook section for ease of connection.

2 Claims, 1 Drawing Sheet

BRAIDED LINE APPARATUS

This is a continuation-in-part application of the application No. 07/844,446 filed on Mar. 2, 1992, now abandoned.

BACKGROUND OF THE INVENTION

This invention pertains to a method for attaching a braided line to a solid shaft.

There are many current methods and means that attach solid material to ropes, line, or the like. Using devices, such as clamps, locking nuts and bolts is well known in the field. The difficulties that are inherent in these designs and should be overcome include the following: The bulkiness and weight created by these connectors is not desirable; A smooth surface is not created by these connection devices. It is the object of this invention to teach a braided line apparatus which avoids the disadvantages and limitations, above recited which occur in previous attaching methods and means.

SUMMARY OF THE INVENTION

Particularly, it is the object of this invention to teach a braided line apparatus, for use with hooks, clips or clamps, or the like, comprising flexible braided line; a constant diameter solid shaft of which a portion is inserted into one end of said flexible braided line of a slightly smaller inside core diameter while the line is under tension for locking said constant diameter solid shaft in position due to the constriction of said braided line when said solid shaft is pulled; said constant diameter solid shaft having a bend of at least 180 degrees; said constant diameter solid shaft further having an arcuate neck portion; said constant diameter solid shaft further having an end opposite said inserted shaft portion which angles away from said inserted shaft portion.

BRIEF DESCRIPTION OF THE INVENTION

Further objects and features of this invention will become more apparent by reference to the following description taken in conjunction with the following figures, in which.

DETAILED DESCRIPTION OF THE PREFERRED EMBODIMENT

Figure 1:
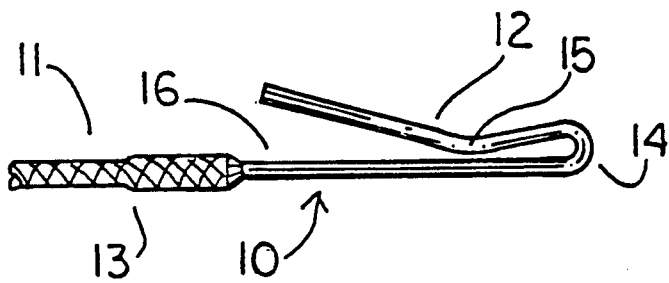
FIG. 1 is a perspective view of the braided line apparatus.
Figure 3:
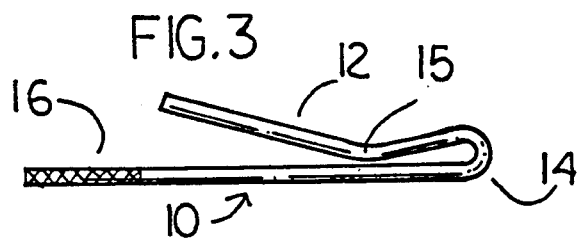
FIG. 3 is a perspective view of the solid shaft portion of the braided line apparatus.
Figure 2:
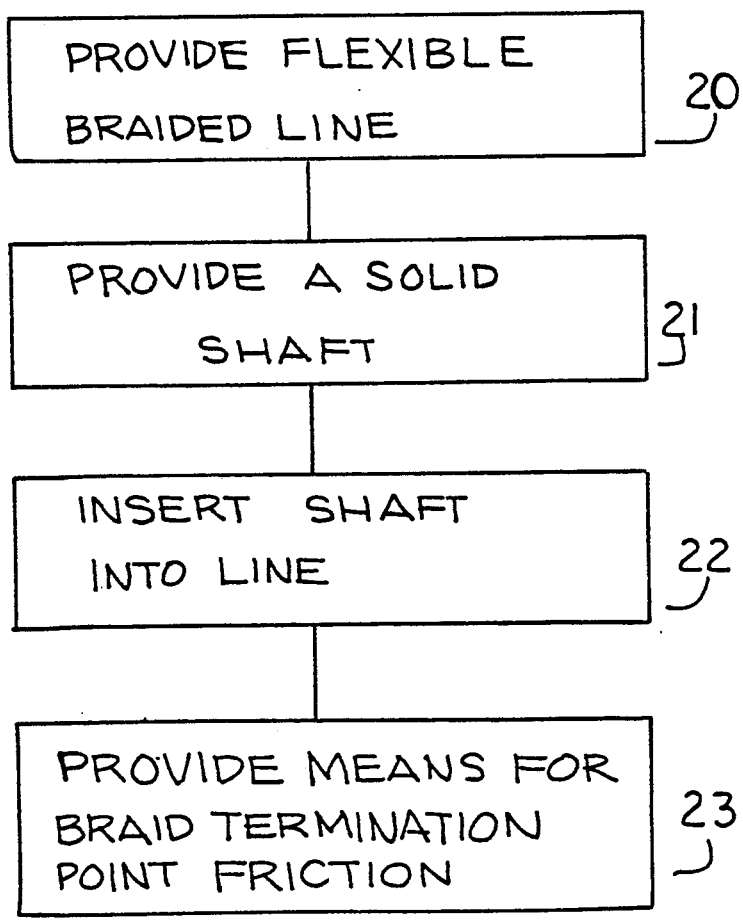
FIG. 2 is a block diagram of the steps used in the novel method.

As shown in the figures, the novel method comprises the steps of 20 providing a flexible, braided line 11; providing 21 a solid shaft of a clip, clamp or hook 12; inserting 22 the shaft 16 of the clip 12 into one slightly smaller end of the flexible, braided line 11; providing means for braid termination point friction 23, such as melting braid into the roughened shaft or a small amount of adhesive, and placing the heat shrink tube 13 around the flexible, braided line 11 and small portion of the shaft 16 where the shaft 16 is inserted into the line 11 only in the immediate vicinity of the braid termination—therefor, most of the shaft, braid overlap contains no other elements. The other features of the means 10 include a bend 14 of at least 180 degrees of the clip and the neck 15 which serves as a lock when the opposite end of the line 11 is positioned therein. The end of the shaft that is inserted into the line which can be roughened or knurled to increase friction, and is only essential in the case of the melting termination of braid into the knurled shaft. The solid shaft is, in fact, locked into position by the constriction of the braided line once tensioned and the heat tube or adhesive, or the melting or a clamp, for that matter, is only used to prevent jiggling loose and a small amount of friction at the braid termination to insure that the constricting force of braid onto the shaft is maximized when the line is tensioned. If the braided line has a center core, it may be removed to allow insertion of the shaft.

In operation, the manufacturer would position the clip so that one end would be inserted into the flexible braided line. The termination point of the braid would be melted into the knurled shaft. The user would then use the opposite end of the line to close the device by simply wedging the opposite end of the line into the neck of the clip which locks the line in position until the user pulls the line out of the restricted area. The line may also be used in alternative ways.

While I have described my invention in connection with specific embodiments thereof, it is clearly to be understood that this is done only by way of example and not as a limitation to the scope of my invention as set forth in the objects thereof and in the appended claims.

I claim:

1. A braided line apparatus comprising:
   flexible, braided line with an inner core having an inner core diameter;
   a constant diameter solid shaft having first and second ends, the diameter of said shaft being slightly larger than said inner core diameter;
   said first end of said shaft being inserted into the inner core of said braided line and being bonded thereto to maintain said shaft in position with respect to said braided line;
   said shaft including a bend of at least 180 degrees, whereby said second end of said shaft is adjacent said first end, said shaft further including an arcuate neck portion located between said bend and said second end such that said second end angles away from said first end; and
   wherein, when opposite pulling forces are simultaneously applied to said braided line and said shaft, said braided line constricts about said shaft.

2. A braided line apparatus, according to claim 1, wherein:
   said first end of said shaft includes a roughened portion for increasing the grip of said braided line about said shaft when said opposite pulling forces are applied to said braided line and said shaft.

* * * * *